(12) United States Patent
Axtell, III et al.

(10) Patent No.: US 9,758,427 B2
(45) Date of Patent: Sep. 12, 2017

(54) HEAVY-METAL-FREE, ION EXCHANGEABLE GLASS ENAMELS

(71) Applicant: Ferro Corporation, Mayfield Heights, OH (US)

(72) Inventors: Enos A. Axtell, III, Seven Hills, OH (US); George E. Sakoske, Independence, OH (US)

(73) Assignee: Ferro Corporation, Mayfield Heights, OH (US)

( * ) Notice: Subject to any disclaimer, the term of this patent is extended or adjusted under 35 U.S.C. 154(b) by 0 days.

(21) Appl. No.: 15/286,610

(22) Filed: Oct. 6, 2016

(65) Prior Publication Data

US 2017/0022099 A1    Jan. 26, 2017

Related U.S. Application Data

(62) Division of application No. 14/375,475, filed as application No. PCT/US2013/037876 on Apr. 24, 2013, now Pat. No. 9,487,439.

(60) Provisional application No. 61/637,408, filed on Apr. 24, 2012.

(51) Int. Cl.
| | | |
|---|---|---|
| *B60J 1/00* | (2006.01) | |
| *C03C 21/00* | (2006.01) | |
| *C03C 17/04* | (2006.01) | |

(52) U.S. Cl.
CPC .............. *C03C 21/005* (2013.01); *B60J 1/00* (2013.01); *C03C 17/04* (2013.01); *C03C 21/002* (2013.01); *C03C 2217/72* (2013.01); *C03C 2218/32* (2013.01)

(58) Field of Classification Search
CPC ....... B60L 1/00; C03C 21/002; C03C 21/005; C03C 17/04
See application file for complete search history.

(56) References Cited

U.S. PATENT DOCUMENTS

| | | |
|---|---|---|
| 3,356,477 A | 12/1967 | Chisholm et al. |
| 3,619,240 A | 11/1971 | Toussaint et al. |
| 3,723,080 A | 3/1973 | Howell et al. |
| 3,904,460 A | 9/1975 | Comperatore |
| 4,029,605 A | 6/1977 | Kosiorek |
| 4,446,059 A | 5/1984 | Eustice |
| 5,334,412 A | 8/1994 | Korn et al. |
| 5,928,793 A | 7/1999 | Kimura |
| 6,128,926 A | 10/2000 | Senapati et al. |
| 6,565,948 B1 * | 5/2003 | Lin .......................... B32B 3/10 156/62 |
| 2011/0183118 A1 | 7/2011 | Lamberson et al. |
| 2011/0199687 A1 | 8/2011 | Sellier et al. |
| 2012/0088872 A1 | 4/2012 | Tong et al. |

FOREIGN PATENT DOCUMENTS

| | | |
|---|---|---|
| RU | 1826961 | 7/1993 |
| RU | 2005114909 | 1/2006 |
| WO | 2004/035498 A3 | 4/2004 |

OTHER PUBLICATIONS

Espacenet bibliographic data for RU Publication No. 1826961 published Jul. 7, 1993, one page.
Rudoy et al., "New Physical-Chemical Methods of Strengthening Glass," 1967, pp. 5-8.
Brief Statement of Relevance for Rudoy et al. article, two pages.
International Search Report for corresponding PCT/US2013/037876 mailed Aug. 29, 2013, two pages.

* cited by examiner

*Primary Examiner* — Nathan Empie
(74) *Attorney, Agent, or Firm* — Rankin, Hill & Clark LLP

(57) ABSTRACT

Heavy-metal-free glass enamels are applied to glass and fired. After firing, the coated glass can subsequently be ion exchanged to give a chemically strengthened, decorated glass article.

15 Claims, No Drawings

HEAVY-METAL-FREE, ION EXCHANGEABLE GLASS ENAMELS

BACKGROUND OF THE INVENTION

1. Field of Invention

The goal of the present invention is to supply heavy-metal-free glass enamels that can be applied to glass and fired. After firing, the coated glass can subsequently be ion exchanged to give a chemically strengthened, decorated glass article. One possible application of such a process would be the decoration of thin glass for electronic devices.

2. Description of Related Art

Glass enamel compositions are well known in the art. One aim of conventional glass and enamel compositions is the achievement of a low firing, high durability glass and enamel having a low coefficient of thermal expansion (CTE).

Chemically strengthened, substrate glass is known in the art. For example, Gorilla Glass®, manufactured by Corning, is made by exchanging the Na ions near the surface of the glass for $K^+$ ions in an ion exchange bath. The larger $K^+$ ions create chemical pressure at the surface of the glass, helping to strengthen the glass. Heating the glass above approximately 400° C. causes the potassium to migrate deeper into the glass, diminishing the effect. For that reason, decorating the ion-exchanged glass with fired-on enamels is not possible. Other types of commercially available chemically strengthened glasses are Schott Xensation®, AGC Dragontrail®, and NEG CX-01.

Glass enamels have been used for many years to decorate automotive, building and appliance glass. The glasses used in these enamels must have softening points well below those of the substrate glasses. For that reason, small alkali metals such as lithium and sodium are sometimes used in relatively large amounts in the glasses to reduce their softening points. Such glasses should theoretically be good candidates for ion exchange, provided that the softening point of the glass used in the enamel is also high enough to avoid dissolution in the ion exchange bath. The enamel should also be chemically stable toward the ion exchange bath.

Glass enamels with lower coefficients of expansion (CTE) than the substrate glass have been designed. These materials can be coated onto glass and fired to fuse them to the substrate. Upon cooling, the glass article is strengthened on the surface by the compression created by the enamel which contracts less.

BRIEF SUMMARY OF THE INVENTION

In the present invention, a low-melting, ion-exchangeable glass is first melted. This glass should have a softening point between the temperature of the molten ion exchange bath chosen and the softening point of the substrate glass. The glass should preferably contain small alkali metal ions, such as lithium and sodium. The network structure of the glass should allow for the future ion exchange of the small alkali metal ions for larger, monovalent cations, such as $K^+$, $Rb^+$, $Cs^+$, $Cu^+$, $Ag^+$, $Au^+$ and $Tl^+$. After melting, the glass is then quenched by some means, such as roll cracking or water cracking. The quenched frit is then ground into a suitably fine powder.

In the next process, the glass powder is mixed with pigments and other solid modifiers as needed in a dry mixing process. The enamel powder is then milled together with an organic medium to form an enamel paste.

The paste is then printed on a glass substrate. Preferably, the substrate glass is itself ion exchangeable. The paste is dried and then the glass substrate is fired to fuse the glass enamel to the substrate. After cooling, the decorated glass is then submersed in an ion exchange bath. After chemical strengthening, the breaking strength of the article is compared to similar substrates in various stages of decorating and strengthening: un-modified substrate glass, ion-exchanged substrate glass and decorated but not ion-exchanged glass. The strength of the glass made by the instant invention should be less than that of the ion-exchanged substrate glass and greater than that of the decorated-only glass.

An embodiment of the invention is a method of decorating and strengthening a glass substrate comprising: (a) applying a glass enamel frit to a glass substrate, the substrate including at least one substrate alkali-metal ion, (b) firing the glass substrate at a firing temperature sufficient to flow and sinter the glass enamel frit and thereby adhere it to the glass substrate, and (c) placing the substrate in a bath of a molten salt, the salt including a bath monovalent metal ion larger than the alkali-metal ion in the glass substrate, wherein the glass enamel frit has a softening point that is between the temperature of the molten bath and that of the firing temperature of the glass enamel frit.

Another embodiment of the invention is a method of strengthening and decorating a glass substrate comprising the steps of: (a) providing a glass substrate, (b) providing a lead-free and cadmium-free glass enamel, (c) coating a portion of said glass substrate with said glass enamel, (d) firing said coated glass substrate, and (e) exposing said coated glass substrate to an ion exchange bath.

Embodiments of the invention include decorated and strengthened glass substrates made by any method disclosed herein. In one embodiment the decorated and strengthened glass substrate is a windshield.

DETAILED DESCRIPTION OF THE INVENTION

The first step in the invention is to select a suitable frit to decorate a substrate. Selection of a frit includes consideration of matching the expansion coefficient between that of the glass substrate and the enamel, which will serve to increase the strength of the decorated, ion-exchanged glass.

Weight reduction is a goal of the invention. If, for example, a current windshield that is made of 3.5-4 mm thick glass could be made with glass reduced to 0.3-1.1 mm/pane (2 panes in a windshield), the weight of the windshield, and by extension, of the automobile, can be reduced significantly. The trade-off may be the need for a thicker piece of plastic lamination (PVB) or polycarbonate.

It is preferable that lead- and cadmium-free glass frits be used. Frits available from Ferro Corporation in the E-8000 series, are suitable. Certain members of this line of products contain larger amounts of Na than others, and so could act as good candidates for chemical strengthening.

The useful frits will have softening points that fall in the range between the temperature of the molten ion exchange bath and the softening point of the substrate glass. For instance, the molten potassium nitrate bath commonly used for ion exchange is generally operated in the range of about 350 to about 400° C. Soda-lime substrate glass is generally processed at temperatures from about 600 to about 700° C. The window of softening points for such a system is therefore, about 425° C. to about 575° C.

Glass Frits: Ground glass particles with a size suitable for glass enamels, such as 0.5 to 40 microns $D_{50}$ average particle size, preferably 0.7 to 20 microns and more preferably 1 to 10 microns are chosen. Preferably the glass is free of heavy-metals and otherwise suitable for glass enamels, with a softening point of 425 to 575° C. The coefficient of thermal expansion is near that of soda lime glass, i.e., $75\text{-}95 \times 10^{-7}/°$ C., preferably $80\text{-}90 \times 10^{-7}/°$ C. more preferably $83\text{-}87 \times 10^{-7}/°$ C. The oxide composition (in mole %) of the glass should consist of network formers such as $SiO_2$ (broadly 0.5-70%, preferably 0.75-65%, more preferably 1-60%), $Al_2O_3$ (broadly 0-6 mole %, preferably 1-5%, more preferably 1.5-4%), $ZrSiO_4$ (broadly 0-4%, preferably 0-3.5%, more preferably 0-3%), and $B_2O_3$ (broadly 10-60%, preferably 12.5-55%, more preferably 15-50%). The $ZrSiO_4$ may be considered as separate portions of $ZrO_2$ and $SiO_2$ each in amounts of 0-3.5%, preferably 0-3%, more preferably 0-2.5%, still more preferably 0-2%. Further, the glass should possess network intermediates such as ZnO (broadly 0-55%, preferably 0-50%, more preferably 0-45%), $Bi_2O_3$ (broadly 0-85%, preferably 0-80%, more preferably 0-75%) and $TiO_2$ (broadly 0-15%, preferably 0-12.5%, more preferably 0-10%).

In any embodiment of the invention, the following oxides may also be included in any combination, given in wt %: SrO—up to 10; CaO—up to 5; MgO—up to 5; $CeO_2$—up to 5; Mn—up to 10; CuO—up to 5; NiO—up to 5; SnO—up to 10; $P_2O_5$—up to 5; $V_2O_5$—up to 10; $La_2O_3$—up to 5; $Pr_2O_3$—up to 5; $Y_2O_3$—up to 5; $In_2O_3$—up to 5; $Fe_2O_3$—up to 10; $Cr_2O_3$—up to 5; CoO—up to 5; $Nb_2O_5$ up to 4; $WO_3$—up to 4; $MoO_3$—up to 4; and S—up to 5.

Finally, the glass should possess network modifiers such as $Li_2O$, (broadly 0-15%, preferably 0-10%, more preferably 2-8%), $Na_2O$, (broadly 0-25%, preferably 0-20%, more preferably 2-18%), $K_2O$, (broadly 0-15%, preferably 0-10%, more preferably 0-8%), BaO, (broadly 0-10%, preferably 0-7.5%, more preferably 0-6%) and fluoride (broadly 0-10%, preferably 0-7.5%, more preferably 0-5%). The presence of $Na_2O$ and $Li_2O$ is of course necessary in order to theoretically provide an exchangeable ion for $K^+$ in the molten $KNO_3$ bath. Larger ions such as $Cs^+$, $Cu^+$, $Ag^+$ may also be included broadly 0-15% to create a mixed alkali effect which could be beneficial to ion exchange processes. Other network intermediates and modifiers may be needed in order to meet all of the necessary properties and will be obvious to those skilled in the art and would not depart from the intent of this technology. These are ranges for typical lead-free frits useful for glass decoration.

Ion-Exchangeable Enamel Powder: Dry, ion-exchangeable enamel powders include the following components, given in weight percent of the whole powder. First, an ion-exchangeable glass frit, as described above should be present in a range of, broadly, 40-100%, preferably 45-100%, more preferably 50-100%. Next, expansion-coefficient-modifying fillers may be necessary additives to bring the glass enamel expansion coefficient in line with that of the glass enamel. In most cases, the expansion coefficient of the enamel must be lowered to match that of the substrate glass. Suitable fillers are β-eucryptite ($LiAlSiO_4$), cordierite (Al/Si/O phase), fused silica ($SiO_2$), zircon ($ZrSiO_4$), ground Pyrex powder and negative thermal expansion materials like $ZrW_2O_8$ and $ZrMo_2O_8$. Other expansion reducing materials may be obvious to those skilled in the art. The expansion reducing filler is optional, but when present, is present in a range of, broadly, 0-30%, preferably 0-25%, more preferably 0-20%. Pigments as outlined above may also be present to color the enamel, in a range of, broadly 0-35%, preferably 0-30%, more preferably 0-25%. In rare cases, expansion-increasing fillers may be needed. An example is crystobalite, which could be added in a range of, broadly, 0-30%, preferably 0-25%, more preferably 0-20%.

Ion-Exchangeable Enamel Paste: The dry powder should be dispersed in an organic vehicle suitable for screen printing, as described. Other application methods such as roll coating, curtain coating, pad printing, ink jet printing and spraying could be used to apply the material to the glass substrate without departing from the invention.

In order to widen the range of allowed softening points for the glass frits, salts other than potassium nitrate can be used. Potassium fluoride, potassium chloride, potassium bromide, potassium iodide, potassium sulfate, potassium phosphate, rubidium fluoride, rubidium chloride, rubidium bromide, rubidium iodide, rubidium sulfate, rubidium phosphate, cesium fluoride, cesium chloride, cesium bromide, cesium iodide, cesium sulfate, cesium phosphate, copper fluoride, copper chloride, copper bromide, copper iodide, copper sulfate, copper phosphate, silver fluoride, silver chloride, silver bromide, silver iodide, silver sulfate, silver phosphate, gold chloride solutions, thallium fluoride, thallium chloride, thallium bromide, thallium iodide, thallium sulfate, thallium phosphate and mixtures thereof are suitable for use in the chemical strengthening of the glass. The use of copper and silver as the ion exchange cation can be beneficial in certain cases. These cations can be reduced to metal nano-particles after migrating into the glass, coloring the glass. The glass can also have the further property of being UV absorbing.

A further consideration is that the frit used for the enamel should not be soluble in the ion exchange bath or be damaged by submersion in it. The glass-forming network must be rigid enough to allow for the cation exchange without collapsing.

The frits used for glass decoration should also possess a coefficient of thermal expansion (CTE) close to that of the substrate glass. This will prevent problems such as bowing of the glass during firing or "crazing" of the enamel on the glass substrate. Glass enamel powders can be pressed into bars and sintered to determine their approximate CTE's. If necessary, expansion modifiers can be added to bring the enamel in line with the substrate glass.

Decoration and Glass Forming.

A glass substrate may be colored or decorated by applying any enamel composition described herein to at least a portion of a substrate, for example, a glass substrate such as a glass sheet, or automotive glass, (i.e., windshield). An enamel composition may, but need not, be applied in the form of a paste as disclosed herein.

In particular, a method of decorating a glass substrate comprising: (a) applying to a glass substrate an enamel composition and (c) firing the substrate and enamel composition at a temperature sufficient to flow the enamel composition to cause the enamel composition to at least partially adhere to the glass substrate. The enamel composition may be applied to the entire surface of a glass substrate, or to only a portion thereof, for example the periphery.

The method may include a glass forming step whereby the glass substrate is heated to an elevated temperature and subjected to a forming pressure to bend the glass substrate. In particular, bending the glass substrate may involve heating the glass substrate to which has been applied the to an elevated temperature, of, for example, at least about 570° C., at least about 600° C., at least about 625° C., or at least about 650° C. Upon heating, the glass is subjected to a forming pressure, e.g., gravity sag or press bending in the range of 0.1 to 5 psi, or 1-4 psi, or typically about 2-3 psi, with a forming die.

Organic Vehicle.

When applied by procedures requiring one, such as screen printing, the foregoing solid ingredients may be combined with an organic vehicle to form a glass enamel composition, which is a paste. The paste in general contains 60-90 wt % solids, (a paste ratio as noted in the Examples of 1.5:1 to 9:1), preferably 65-85%, more preferably 70-80 wt %, as above described and 10-40% of an organic vehicle, preferably 15-35%, more preferably 20-30%. The viscosity of the paste is adjusted so that it can be screen-printed, roll coated, sprayed, or otherwise applied in a desired manner onto the desired substrate. Other preferred paste ratios are about 3.5:1 to 4.5:1, and more preferably about 3.7:1 to 4.4:1.

The organic vehicle comprises a binder and a solvent, which are selected based on the intended application. It is essential that the vehicle adequately suspend the particulates (i.e., frit, pigment, crystalline material) and burn off completely upon firing. In particular, binders including methyl cellulose, ethyl cellulose, and hydroxypropyl cellulose, and combinations thereof, may be used. Suitable solvents include propylene glycol, diethylene glycol butyl ether; 2,2,4-trimethyl pentanediol monoisobutyrate (Texanol™); alpha-terpineol; beta-terpineol; gamma terpineol; tridecyl alcohol; diethylene glycol ethyl ether (Carbitol™), diethylene glycol butyl ether (Butyl Carbitol™); pine oils, vegetable oils, mineral oils, low molecular weight petroleum fractions, tridecyl alcohols, and synthetic or natural resins and blends thereof. Surfactants and/or other film forming modifiers can also be included. The solvent and binder may be present in a weight ratio of about 50:1 to about 20:1. The preferred vehicle is a combination of Butyl Carbitol™ (diethylene glycol monobutyl ether) and ethyl cellulose in a weight ratio of about 200:1 to 20:1, preferably 50:1 to about 20:1, more preferably about 40:1 to about 25:1.

The metal oxide precursor pastes of the present subject matter are capable of being applied to at least a portion of a substrate with many varied techniques. A particular benefit of the preferred pastes is that the viscosity and components of the pastes are capable of being tailored for each specific application strategy.

In a preferred aspect of the present subject matter, the metal oxide precursor paste is applied to at least a portion of a substrate by screen printing. Screen printing is a coating technique that uses a fine mesh or screen with blank areas coated with an impermeable substance. Normally, a coating material is forced into the openings of the mesh by a fill blade or squeegee and onto the substrate surface during the squeegee stroke, thus coating at least a portion of the substrate. Screen printing allows for relatively inexpensive coverage of large surface areas of a substrate. Screen printing also allows for shapes, designs, lettering, logos, or the like to be applied to a substrate. In the screen printing application, the coating material must sit on the screen and not drip though the screen until the squeegee applies pressure and shear to the coating material. The viscosity range for the coating material for this type of application technique is from about 1000 to about 180,000 cP. In accordance with a preferred aspect of the present subject matter, the metal oxide precursor paste is applied by a screen printing process where the metal oxide precursor paste is forced into the mesh openings to coat at least a portion of a substrate. The amount of resin in the paste is adjusted to achieve the desired viscosity mentioned herein of about 1000 to about 180,000 cP at 20° C., as determined on a Brookfield Viscometer, #29 spindle at 10 rpm, are appropriate.

In another preferred embodiment, the pastes of the present subject matter are tailored for and applied to at least a portion of a substrate by digital printing. In this aspect, the paste is capable of being forced through small nozzles and onto at least a portion of a substrate. The amount of resin is adjusted to attain a viscosity ranging from about 1 to about 400 cP.

In another preferred embodiment, the amount of resin in the paste is adjusted for and applied to at least a portion of a substrate by roll coating application techniques. The paste(s) is modified with an amount of resin to attain a viscosity ranging from about 100 to about 25,000 cP. At this viscosity the paste remains on the roll until the roll touches at least a portion of the substrate, transferring the paste to the substrate.

Pigments.

In certain embodiments, the glass frit can be combined with a pigment, such as a mixed metal oxide pigment. When used, such pigments generally constitute no greater than about 30 wt %, preferably 0.1-30%, more preferably 1-25 wt %, still more preferably 2-20 wt %, of the glass enamel compositions herein, depending upon the range of color, gloss, and opacity (i.e., transmittance) desired.

Keeping in mind the general preference for completely lead-free, cadmium-free, and bismuth-free compositions for food and beverages, useful pigments may come from several of the major classifications of complex inorganic pigments, including corundum-hematite, olivine, priderite, pyrochlore, rutile, spinel, and spinel, though other categories such as baddeleyite, borate, garnet, periclase, phenacite, phosphate, sphene and zircon may be suitable in certain applications. Oxides of the metals cobalt, chromium, manganese, praseodymium, iron, nickel, and copper are often useful. In particular, specific pigments include cobalt silicate blue olivine $Co_2SiO_4$; nickel barium titanium primrose priderite $2NiO:3BaO:17TiO_2$; nickel antimony titanium yellow rutile $(Ti,Ni,Nb)O_2$; nickel niobium titanium yellow rutile $(Ti,Ni,Nb)O_2$; nickel tungsten yellow rutile $(Ti,Ni,W)O_2$; chrome antimony titanium buff $(Ti,Cr,Sb)O_2$; chrome niobium titanium buff rutile $(Ti,Cr,Nb)O_2$; chrome tungsten titanium buff rutile $(Ti,Cr,W)O_2$; manganese antimony titanium buff rutile $(Ti,Mn,Sb)O_2$; titanium vanadium grey rutile $(Ti,V,Sb)O_2$; manganese chrome antimony titanium brown rutile $(Ti,Mn,Cr,Sb)O_2$; manganese niobium titanium brown rutile $(Ti,Mn,Nb)O_2$; cobalt aluminate blue spinel $CoAl_2O_4$; zinc chrome cobalt aluminum spinel $(Zn,Co)(Cr,Al)_2O_4$; cobalt chromate blue-green spinel $CoCr_2O_4$; cobalt titanate green spinel $Co_2TiO_4$; iron chromite brown spinel $Fe(Fe,Cr)_2O_4$; iron titanium brown spinel $Fe_2TiO_4$; nickel ferrite brown spinel $NiFe_2O_4$; zinc ferrite brown spinel $(Zn,Fe)Fe_2O_4$; zinc iron chromite brown spinel $(Zn,Fe)(Fe,Cr)_2O_4$; copper chromite black spinel $CuCr_2O_4$; iron cobalt chromite black spinel $(Co,Fe)(Fe,Cr)_2O_4$; chrome iron manganese brown spinel $(Fe,Mn)(Cr,Fe)_2O_4$; chrome iron nickel black spinel $(Ni,Fe)(Cr,Fe)_2O_4$; and chrome manganese zinc brown spinel $(Zn,Mn)(Cr_2O_4)$. Only in applications where lead is permitted (i.e., other than food or beverage containers, tableware, etc.), lead antimonite yellow pyrochlore $(Pb_2Sb_2O_7)$ or other lead-containing pigments may be used. Commercially available examples of suitable pigments are available from Ferro Glass and Color Corporation, such as 2991 pigment (copper chromite black), 2980 pigment (cobalt chromium iron black), 2987 pigment (nickel manganese iron chromium black), and O-1776 pigment (black). In some embodiments, pigments free from Co, Cu, Cr, Ni and the like such a 10201 black (bismuth manganate) would also be suitable. In a preferred embodiment, no bismuth is present in the pigment.

Especially preferred are pigments having the following Ferro Corporation product numbers and formulas: K393 (CuCrMn), V792 (NiMnCrFe), 2503 (CdSeS), 2336 (CoAl), and 2501 (CdSeS), however this is in the context of the overall preference for enamels that are free of intentionally added lead, cadmium and bismuth.

Ion-Exchangeable Enamel Paste: The dry powder should be dispersed in an organic vehicle suitable for screen printing, as described. Other application methods such as roll coating, curtain coating, pad printing, ink jet printing and spraying could be used to apply the material to the glass substrate without departing from the invention.

The following non-limiting examples will help to illustrate the concepts of the present invention.

The glass from the Examples below was strength tested on an Instron 4465 tester by the ball and ring method. The glass was placed on the ring and pressed with a 1" ball until their breaking points were reached. The details of the strength testing are reported in the Examples and in Tables 1-3. Examples 1 to 4 are bare glass examples which demonstrate that ion-exchange method results in strengthening of the glass. Examples 5, 7 and 9 are decorated but not ion-exchanged trials. Examples 6, 8 and 10 are inventive examples demonstrating that ion-exchange and decoration together can strengthen the glass.

Ten 50×75×1 mm microscope slides were washed with a glass cleaner and dried with a paper towel. The slides were individually placed flat on a 1 mm thick sheet of alumina. The alumina sheet was placed on a wire mesh and the set-up was fired at 427° C. for 5 minutes. Following this "pre-heat" step, the panes were next placed in a furnace set at 625° C. and fired for 3 minutes. The slides were then placed vertically into a Wheaton carrier basket and heated at 390° C. for 24 hours. All of these heating steps were undertaken to mimic the thermal history experienced by the slides in the following examples. After cooling, the slides were washed in tap and DI water and dried with paper towels. Packing tape was placed on one side of each slide and it was replaced in the Wheaton basket for transport and storage.

These bare microscope slides were placed on the Instron tester with the glass side facing the ball and the taped side facing the ring. Each slide was pressed with the ball at 0.127 inches/minute until the slide cracked. The breaking force was recorded.

Example 2

Ten 50×75×1 mm microscope slides were washed with a glass cleaner and dried with a paper towel. The slides were placed flat on a 1 mm thick sheet of alumina. The alumina sheet was placed on a wire mesh and the set-up was fired at 427° C. for 5 minutes. Following this "pre-heat" step, the panes were next placed in a furnace set at 625° C. and fired for 3 minutes. The slides were then placed vertically into a Wheaton carrier basket. The basket was placed in a molten KNO₃ bath at 390° C. and ion-exchanged for 24 hours. The basket was then lifted from the bath and cooled. The slides were washed in tap and DI water and dried with paper towels. Packing tape was placed on one side of each slide and it was replaced in the Wheaton basket for transport and storage.

These bare, ion-exchanged microscope slides of were placed on the Instron tester with the glass side facing the ball and the taped side facing the ring. Each slide was pressed with the ball at 0.127 inches/minute until the slide cracked. The breaking force was recorded.

Example 3

Ten 50×75×1 mm microscope slides were washed with a glass cleaner and dried with a paper towel. The slides were individually placed flat on a 1 mm thick sheet of alumina. The alumina sheet was placed on a wire mesh and the set-up was fired at 427° C. for 5 minutes. Following this "pre-heat" step, the panes were next placed in a furnace set at 610° C. and fired for 3 minutes. The slides were then placed vertically into a Wheaton carrier basket and heated at 390° C. for 24 hours. All of these heating steps were undertaken to mimic the thermal history experienced by the slides in the following examples. After cooling, the slides were washed in tap and DI water and dried with paper towels. Packing tape was placed on one side of each slide and it was replaced in the Wheaton basket for transport and storage.

These bare microscope slides were placed on the Instron tester with the glass side facing the ball and the taped side facing the ring. Each slide was pressed with the ball at 0.127 inches/minute until the slide cracked. The breaking force was recorded.

Example 4

Ten 50×75×1 mm microscope slides were washed with a glass cleaner and dried with a paper towel. The slides were placed flat on a 1 mm thick sheet of alumina. The alumina sheet was placed on a wire mesh and the set-up was fired at 427° C. for 5 minutes. Following this "pre-heat" step, the panes were next placed in a furnace set at 610° C. and fired for 3 minutes. The slides were then placed vertically into a Wheaton carrier basket. The basket was placed in a molten KNO₃ bath at 390° C. and ion-exchanged for 24 hours. The basket was then lifted from the bath and cooled. The slides were washed in tap and DI water and dried with paper towels. Packing tape was placed on one side of each slide and it was replaced in the Wheaton basket for transport and storage.

These bare, ion-exchanged microscope slides of were placed on the Instron tester with the glass side facing the ball and the taped side facing the ring. Each slide was pressed with the ball at 0.127 inches/minute until the slide cracked. The breaking force was recorded.

Example 5

15 g of E-8018, a lead-free, sodium-containing frit available from Ferro Corporation, was dispersed into 4.5 g of C-92 Medium, available from Ferro Corporation. The paste was mulled together on a glass plate until smooth and uniform.

Ten 50×75×1 mm microscope slides were washed with a glass cleaner and dried with a paper towel. The paste was printed on the slides through a 230-Mesh/inch screen. The slides were then placed on a hotplate to dry. After drying, the slides were placed flat on a 1 mm thick sheet of alumina. The alumina sheet was placed on a wire mesh and the set-up was fired at 427° C. for 5 minutes. Following this "pre-heat" step, the panes were next placed in a furnace set at 625° C. and fired for 3 minutes. After cooling, the slides were then placed vertically into a Wheaton carrier basket and heated at 390° C. for 24 hours to mimic the thermal history experienced by the other groups of slides. After cooling, the slides were washed in tap and DI water and dried with paper towels. Packing tape was placed on the reverse side of each slide and it was replaced in the Wheaton basket for transport and storage.

These enameled microscope slides were placed on the Instron tester with the coated side facing the ball and the taped side facing the ring. Each slide was pressed with the ball at 0.127 inches/minute until the slide cracked. The breaking force was recorded.

Example 6

15 g of E-8018, a lead-free, sodium-containing frit available from Ferro Corporation, was dispersed into 4.5 g of C-92 Medium, available from Ferro Corporation. The paste was mulled together on a glass plate until smooth and uniform.

Ten 50×75×1 mm microscope slides were washed with a glass cleaner and dried with a paper towel. The paste was printed on the slides through a 230-Mesh/inch screen. The slides were then placed on a hotplate to dry. After drying, the slides were placed flat on a 1 mm thick sheet of alumina. The alumina sheet was placed on a wire mesh and the set-up was fired at 427° C. for 5 minutes. Following this "pre-heat" step, the panes were next placed in a furnace set at 625° C. and fired for 3 minutes. After cooling, the slides were then placed vertically into a Wheaton carrier basket. The basket was placed in a molten $KNO_3$ bath at 390° C. and ion-exchanged for 24 hours. The basket was then lifted from the bath and cooled. After cooling, the slides were washed in tap and DI water and dried with paper towels. Packing tape was placed on the reverse side of each slide and it was replaced in the Wheaton basket for transport and storage.

These enamel-coated, ion-exchanged microscope slides were placed on the Instron tester with the coated side facing the ball and the taped side facing the ring. Each slide was pressed with the ball at 0.127 inches/minute until the slide cracked. The breaking force was recorded.

Example 7

15 g of E-8039, a lead-free, lithium- and sodium-containing frit available from Ferro Corporation, was dispersed into 4.5 g of C-92 Medium, available from Ferro Corporation. The paste was mulled together on a glass plate until smooth and uniform.

Ten 50×75×1 mm microscope slides were washed with a glass cleaner and dried with a paper towel. The paste was printed on the slides through a 230-Mesh/inch screen. The slides were then placed on a hotplate to dry. After drying, the slides were placed flat on a 1 mm thick sheet of alumina. The alumina sheet was placed on a wire mesh and the set-up was fired at 427° C. for 5 minutes. Following this "pre-heat" step, the panes were next placed in a furnace set at 610° C. and fired for 3 minutes. After cooling, the slides were then placed vertically into a Wheaton carrier basket and heated at 390° C. for 24 hours to mimic the thermal history experienced by the other groups of slides. After cooling, the slides were washed in tap and DI water and dried with paper towels. Packing tape was placed on the reverse side of each slide and it was replaced in the Wheaton basket for transport and storage.

These enameled microscope slides were placed on the Instron tester with the coated side facing the ball and the taped side facing the ring. Each slide was pressed with the ball at 0.127 inches/minute until the slide cracked. The breaking force was recorded.

Example 8

15 g of E-8039, a lead-free, lithium- and sodium-containing frit available from Ferro Corporation, was dispersed into 4.5 g of C-92 Medium, available from Ferro Corporation. The paste was mulled together on a glass plate until smooth and uniform.

Ten 50×75×1 mm microscope slides were washed with a glass cleaner and dried with a paper towel. The paste was printed on the slides through a 230-Mesh/inch screen. The slides were then placed on a hotplate to dry. After drying, the slides were placed flat on a 1 mm thick sheet of alumina. The alumina sheet was placed on a wire mesh and the set-up was fired at 427° C. for 5 minutes. Following this "pre-heat" step, the panes were next placed in a furnace set at 610° C. and fired for 3 minutes. After cooling, the slides were then placed vertically into a Wheaton carrier basket. The basket was placed in a molten $KNO_3$ bath at 390° C. and ion-exchanged for 24 hours. The basket was then lifted from the bath and cooled. After cooling, the slides were washed in tap and DI water and dried with paper towels. Packing tape was placed on the reverse side of each slide and it was replaced in the Wheaton basket for transport and storage.

These enamel-coated, ion-exchanged microscope slides were placed on the Instron tester with the coated side facing the ball and the taped side facing the ring. Each slide was pressed with the ball at 0.127 inches/minute until the slide cracked. The breaking force was recorded.

Example 9

12 g of E-8018, a lead-free, sodium-containing frit available from Ferro Corporation and 3 g of P9-51, a black pigment available from Asahi Corporation, was dispersed into 4.5 g of C-92 Medium, available from Ferro Corporation. The paste was mulled together on a glass plate until smooth and uniform.

Ten 50×75×1 mm microscope slides were washed with a glass cleaner and dried with a paper towel. The paste was printed on the slides through a 160-Mesh/inch screen. The slides were then placed on a hotplate to dry. After drying, the slides were placed flat on a 1 mm thick sheet of alumina. The alumina sheet was placed on a wire mesh and the set-up was fired at 427° C. for 5 minutes. Following this "pre-heat" step, the panes were next placed in a furnace set at 625° C. and fired for 3 minutes. After cooling, the slides were then placed vertically into a Wheaton carrier basket and heated at 390° C. for 24 hours to mimic the thermal history experienced by the other groups of slides. After cooling, the slides were washed in tap and DI water and dried with paper towels. Packing tape was placed on the reverse side of each slide and it was replaced in the Wheaton basket for transport and storage.

These enameled microscope slides were placed on the Instron tester with the coated side facing the ball and the taped side facing the ring. Each slide was pressed with the ball at 0.127 inches/minute until the slide cracked. The breaking force was recorded.

Example 10

12 g of E-8018, a lead-free, sodium-containing frit available from Ferro Corporation and 3 g of P9-51, a black pigment available from Asahi Corporation, was dispersed into 4.5 g of C-92 Medium, available from Ferro Corporation. The paste was mulled together on a glass plate until smooth and uniform.

Ten 50×75×1 mm microscope slides were washed with a glass cleaner and dried with a paper towel. The paste was printed on the slides through a 160-Mesh/inch screen. The slides were then placed on a hotplate to dry. After drying, the slides were placed flat on a 1 mm thick sheet of alumina. The alumina sheet was placed on a wire mesh and the set-up was fired at 427° C. for 5 minutes. Following this "pre-heat" step, the panes were next placed in a furnace set at 625° C. and fired for 3 minutes. After cooling, the slides were then placed vertically into a Wheaton carrier basket. The basket was placed in a molten $KNO_3$ bath at 390° C. and ion-exchanged for 24 hours. The basket was then lifted from the bath and cooled. After cooling, the slides were washed in tap and DI water and dried with paper towels. Packing tape was placed on the reverse side of each slide and it was replaced in the Wheaton basket for transport and storage.

These enameled, ion-exchanged microscope slides were placed on the Instron tester with the coated side facing the ball and the taped side facing the ring. Each slide was pressed with the ball at 0.127 inches/minute until the slide cracked. The breaking force was recorded.

In Table 1, Examples 1 to 4 are the results obtained for bare microscope slides. The pairs of Examples 1-2 and 3-4 are different from each other in the heating profile and the number of trials made and broken. As expected for each pair, ion-exchange (Examples 2 and 4) strengthens the slides compared to those which have not been ion-exchanged (Examples 1 and 3).

Examples 5-10 examine three different enamels. In each case, ion-exchange can be seen to basically double the strength of the glass. While the ion-exchanged, bare glass slides are the strongest here, the enameled slides can be strengthened significantly by the ion exchange process as well.

TABLE 1

Strength Test Results on Microscope Slides

| Example Number | Enamel System | Ion-Exchange State | Low Break Strength (lbs force.) | High Break Strength (lbs force) | Ave. Break Strength (lbs force) |
| --- | --- | --- | --- | --- | --- |
| Example 1 | None | No | 14 | 85 | 37.53 |
| Example 2 | None | Yes | 61 | 103 | 74.42 |
| Example 3 | None | No | 25 | 51 | 33.60 |
| Example 4 | None | Yes | 97 | 138 | 114.20 |
| Example 5 | E-8018 | No | 13 | 45 | 32.43 |
| Example 6 | E-8018 | Yes | 54 | 85 | 65.56 |
| Example 7 | E-8039 | No | 22 | 57 | 33.29 |
| Example 8 | E-8039 | Yes | 51 | 100 | 86.80 |
| Example 9 | E-8018 + Blk. | No | 22 | 47 | 37.22 |
| Example 10 | E-8018 + Blk. | Yes | 42 | 99 | 80.44 |

The term "comprising" provides support for "consisting essentially of" and "consisting of." It is envisioned that an individual numerical value for a parameter, temperature, weight, percentage, etc., disclosed herein in any form, such as presented in a table, provides support for the use of such value as the endpoint of a range. A range may be bounded by two such values. In a single embodiment, more than one glass composition can be used, and compositions comprising amounts and ranges from different columns among the tables are also envisioned.

Certain embodiments of the invention are envisioned where at least some percentages, temperatures, times, and ranges of other values are preceded by the modifier "about." All compositional percentages are by weight and are given for a blend prior to firing. Numerical ranges of oxides or other ingredients that are bounded by zero on the lower end (for example, 0-15 wt % ZnO) are intended to provide support for the concept "up to [the upper limit]," for example "up to 15 wt % ZnO" as well as a positive recitation that the ingredient in question is present in an amount that does not exceed the upper limit. The reverse is also true.

Each numerical range disclosed herein that is bounded by zero, has, as alternative embodiments, a lower bound of 0.01% or 0.1% instead of zero. All ranges disclosed herein are to be understood to encompass the beginning and ending range values and any and all subranges therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1.0 to 2.7, 3.3 to 8.9, 5.7 to 10, or individual values like 3.14159, 5.17, 8.07 or 9.58 for example. In other words, ranges are used as shorthand for describing each and every value that is within the range. Any value within the range can be selected as a terminus of a subrange within the range.

The invention claimed is:

1. A decorated and strengthened glass substrate formed by a method comprising:
   (a) providing a substrate including a first major surface and a second major surface oppositely directed from the first major surface, the first and second major surfaces being joined by an outer edge,
   (b) applying an enamel composition to the first major surface of the glass substrate, the second major surface of the glass substrate, or a combination thereof, the enamel composition including a pigment and between 45-100 wt % glass enamel frit comprising at least one enamel alkali-metal ion,
   (c) firing the glass substrate at a firing temperature sufficient to flow and sinter the glass enamel frit and thereby form a colored enamel adhered to the glass substrate, and
   (d) placing the enameled glass substrate in a bath of a molten salt, the molten salt including a bath monovalent metal ion larger than the at least one enamel alkali-metal ion,
   wherein the glass enamel frit has a softening point that is between the temperature of the molten bath and a softening point of the glass substrate, wherein the glass enamel frit is free of lead and cadmium, and wherein the colored enamel remains as a decorative functional layer on the glass substrate for the life of the substrate.

2. The decorated and strengthened glass substrate of claim 1 wherein the at least one enamel alkali-metal ion is at least one of $Li^+$, $Na^+$, and $Rb^+$.

3. The decorated and strengthened glass substrate of claim 2, wherein the bath monovalent metal ion is selected from the group consisting of $Na^+$, $K^+$, $Rb^+$, $Cs^+$, and combinations thereof.

4. The decorated and strengthened glass substrate of claim 1, wherein the bath monovalent metal ion is selected from the group consisting of $Cu^+$, $Ag^+$, $Tl^+$ and combinations thereof, together with at least one alkali-metal ion that is larger than the at least one enamel alkali-metal ion.

5. The decorated and strengthened glass substrate of claim 1, wherein the bath monovalent metal ion diffused through the colored enamel and then into the glass substrate under the colored enamel, as well as directly into the glass substrate on the reverse side.

6. The decorated and strengthened glass substrate of claim 1 wherein the bath monovalent metal ion strengthened the glass substrate on the reverse side from the colored enamel, and strengthened the colored enamel without penetrating through the colored enamel to the portion of the glass substrate underneath the colored enamel.

7. The decorated and strengthened glass substrate of claim 1 wherein the decorated and strengthened glass substrate is a windshield.

8. The decorated and strengthened glass substrate of claim 1 wherein before the glass substrate is placed in the bath of the molten salt, the method further comprises:
heating the glass substrate to an elevated temperature, and exerting a forming pressure of 0.1-5 pounds per square inch to the heated glass substrate.

9. The decorated and strengthened glass substrate of claim 1 wherein the pigment comprises a mixed metal oxide pigment included at 0.1-30 wt % of the total weight of the enamel composition.

10. The decorated and strengthened glass substrate of claim 9 wherein the mixed metal oxide pigment is selected from the group consisting of cobalt silicate blue olivine $Co_2SiO_4$; nickel barium titanium primrose priderite $2NiO:3BaO:17TiO_2$; nickel antimony titanium yellow rutile $(Ti,Ni,Nb)O_2$; nickel niobium titanium yellow rutile $(Ti,Ni,Nb)O_2$; nickel tungsten yellow rutile $(Ti,Ni,W)O_2$; chrome antimony titanium buff $(Ti,Cr,Sb)O_2$; chrome niobium titanium buff rutile $(Ti,Cr,Nb)O_2$; chrome tungsten titanium buff rutile $(Ti,Cr,W)O_2$; manganese antimony titanium buff rutile $(Ti,Mn,Sb)O_2$; titanium vanadium grey rutile $(Ti,V,Sb)O_2$; manganese chrome antimony titanium brown rutile $(Ti,Mn,Cr,Sb)O_2$; manganese niobium titanium brown rutile $(Ti,Mn,Nb)O_2$; cobalt aluminate blue spinel $CoAl_2O_4$; zinc chrome cobalt aluminum spinel $(Zn,Co)(Cr,Al)_2O_4$; cobalt chromate blue-green spinel $CoCr_2O_4$; cobalt titanate green spinel $Co_2TiO_4$; iron chromite brown spinel $Fe(Fe,Cr)_2O_4$; iron titanium brown spinel $Fe_2TiO_4$; nickel ferrite brown spinel $NiFe_2O_4$; zinc ferrite brown spinel $(Zn,Fe)Fe_2O_4$; zinc iron chromite brown spinel $(Zn,Fe)(Fe,Cr)_2O_4$; copper chromite black spinel $CuCr_2O_4$; iron cobalt chromite black spinel $(Co,Fe)(Fe,Cr)_2O_4$; chrome iron manganese brown spinel $(Fe,Mn)(Cr,Fe)_2O_4$; chrome iron nickel black spinel $(Ni,Fe)(Cr,Fe)_2O_4$; chrome manganese zinc brown spinel $(Zn,Mn)(Cr_2O_4)$; and combinations thereof.

11. The decorated and strengthened glass substrate of claim 1 wherein the enamel composition further comprises at least one expansion modifier.

12. The decorated and strengthened glass substrate of claim 11 wherein the at least one expansion modifier is selected from the group consisting of β-eucryptite, cordierite, fused silica, zircon, $ZrW_2O_8$, $ZrMo_2O_8$ and crystobalite.

13. A decorated and strengthened glass substrate formed by a method comprising:
(a) providing a glass substrate comprising a first major surface and a second major surface oppositely directed from the first major surface, the first and second major surfaces being joined by an outer edge,
(b) providing a lead-free and cadmium-free glass enamel composition including a pigment and between 45-100 wt % of a glass frit, the glass frit including at least one enamel alkali-metal ion,
(c) coating a portion of the first major surface, the second major surface, or a combination thereof with said glass enamel composition,
(d) firing said coated glass substrate to sinter the glass enamel composition, thereby forming a colored enamel on the coated portion of the glass substrate, and
(e) exposing said fired coated glass substrate to an ion exchange bath including a bath monovalent metal ion that is larger than the at least one enamel alkali-metal ion, wherein the colored enamel remains as a decorative functional layer on the glass substrate for the life of the substrate.

14. The decorated and strengthened glass substrate of claim 13 wherein the at least one enamel alkali-metal ion includes at least one of the following ions: $Li^+$, $Na^+$, $K^+$, $Rb^+$, and $Cs^+$.

15. The decorated and strengthened glass substrate of claim 13 wherein the bath monovalent metal ion is selected from the group consisting of $Cu^+$, $Ag^+$, $Tl^+$ and combinations thereof, together with at least one alkali-metal ion that is larger than the at least one enamel alkali-metal ion.

\* \* \* \* \*